United States Patent
Mays, II et al.

(10) Patent No.: US 9,307,623 B1
(45) Date of Patent: Apr. 5, 2016

(54) METHOD TO CONTROL STRIATIONS IN A LAMP POWERED BY AN ELECTRONIC BALLAST

(71) Applicant: Universal Lighting Technologies, Inc., Madison, AL (US)

(72) Inventors: Stephen D. Mays, II, Madison, AL (US); John J. Dernovsek, Madison, AL (US); Brandon Dyer, Huntsville, AL (US); Danny Pugh, Harvest, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 14/335,526

(22) Filed: Jul. 18, 2014

Related U.S. Application Data

(60) Provisional application No. 61/847,824, filed on Jul. 18, 2013.

(51) Int. Cl.
  *H05B 41/282* (2006.01)
  *H02M 7/5375* (2006.01)
  *H02M 7/5387* (2007.01)

(52) U.S. Cl.
  CPC ......... *H05B 41/2828* (2013.01); *H02M 7/5387* (2013.01)

(58) Field of Classification Search
  CPC .................. H05B 41/2828; H02M 7/5387
  USPC .......................................................... 315/224
  See application file for complete search history.

(56) References Cited

U.S. PATENT DOCUMENTS

| | | | |
|---|---|---|---|
| 5,001,386 A | 3/1991 | Sullivan et al. | |
| 5,041,763 A | 8/1991 | Sullivan et al. | |
| 5,192,896 A | 3/1993 | Qin | |
| 5,369,339 A | 11/1994 | Reijnaerts | |
| 5,701,059 A | 12/1997 | Steigerwald et al. | |
| 6,069,453 A | 5/2000 | Arts et al. | |
| 6,465,972 B1 | 10/2002 | Kachmarik et al. | |
| 7,719,204 B1 | 5/2010 | Poehlman | |
| 2008/0054825 A1* | 3/2008 | Gulsen et al. | 315/307 |
| 2009/0302775 A1* | 12/2009 | Alexandrov | 315/224 |
| 2010/0327761 A1* | 12/2010 | Jin | 315/219 |
| 2014/0368175 A1* | 12/2014 | Ryoo et al. | 323/272 |

* cited by examiner

*Primary Examiner* — Dylan White
(74) *Attorney, Agent, or Firm* — Patterson Intellectual Property Law, P.C.; Mark J. Patterson

(57) ABSTRACT

A high efficiency electronic ballast or driver circuit provides striation control at reduced power levels. The driver circuit includes a controller operating a half-bridge inverter to drive a resonant tank circuit. The controller provides asymmetric on-times to upper and lower switches of the half-bridge inverter when operating at low duty cycles (e.g., duty cycles of 50% or less). The resulting asymmetric output current eliminates striation in lamps driven by the ballast. In order to maintain light output (i.e., output current), the controller reduces the operating frequency of the half-bridge inverter to increase the gain and impedance of the resonant tank circuit.

18 Claims, 4 Drawing Sheets

METHOD TO CONTROL STRIATIONS IN A LAMP POWERED BY AN ELECTRONIC BALLAST

CROSS-REFERENCES TO RELATED APPLICATIONS

This application claims priority to U.S. Provisional Patent Application Ser. No. 61/847,824 filed on Jul. 18, 2013 entitled, "METHOD TO CONTROL STRIATIONS IN A LAMP POWERED BY AN ELECTRONIC BALLAST."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Striations in a fluorescent lamp are undesirable visible variations in the evenness of light emitted by the fluorescent lamp. Striations are common when operating at low temperature, reduced power, or with energy efficient lamps. Some methods for controlling striations at low power include generating and combining multiple drive signal components (e.g., a direct current and/or low frequency component combined with a higher frequency primary drive signal component). These solutions require additional driver circuit electronic components (i.e., entire driver circuit sections to generate the additional signals) which add to the size and complexity of the driver circuit while decreasing reliability. Another method of reducing striations is to apply an unbalanced direct current (DC) choke to the output signals from the driver circuit to introduce an asymmetric current. This solution requires the addition of a large magnetic component that adds size, expense, and complexity to the driver circuit. Further, all of the above striation solutions introduce substantial efficiency reductions to the driver circuit or ballast.

BRIEF SUMMARY OF THE INVENTION

Aspects of the present invention provide striation control in high efficiency fluorescent lamp ballasts or driver circuits that include a controller operating a half-bridge inverter to drive a resonant tank circuit. The controller provides asymmetric on-times to upper and lower switches of the half-bridge inverter when operating at low lamp currents (e.g., duty cycles of less than 50%). In order to maintain light output (i.e., output current), the controller reduces the operating frequency of the half-bridge inverter to increase the gain and impedance of the resonant tank circuit.

In one aspect, a driver circuit used to provide power to a load from a power source includes a controller, a half-bridge inverter, and a resonant tank circuit. The controller provides an upper switch drive signal and a lower switch drive signal. An on-time of the upper switch drive signal is less than an on-time of the lower switch drive signal. The half-bridge inverter provides an output signal as a function of the upper drive signal and the lower drive signal. The resonant tank circuit receives the output signal from the half-bridge inverter and provides power to the load as a function of the received output signal.

In another aspect, a light fixture receives power from a power source and provides power to a light source. The light source provides illumination in response to receiving power from the light fixture. The light fixture includes a driver circuit and a housing to support the driver circuit and the light source. The driver circuit provides power to the light source load from a power source. The driver circuit includes an input stage, a controller, a half-bridge inverter, and a resonant tank circuit. The input stage receives power from the power source and provides a direct current (DC) power rail and a ground to the driver circuit. The controller provides an upper switch drive signal and a lower switch drive signal. An on-time of the upper switch drive signal is less than an on-time of the lower switch drive signal. The half-bridge inverter provides an output signal as a function of the upper drive signal and the lower drive signal. The resonant tank circuit receives the output signal from the half-bridge inverter and provides power to the light source as a function of the received output signal.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
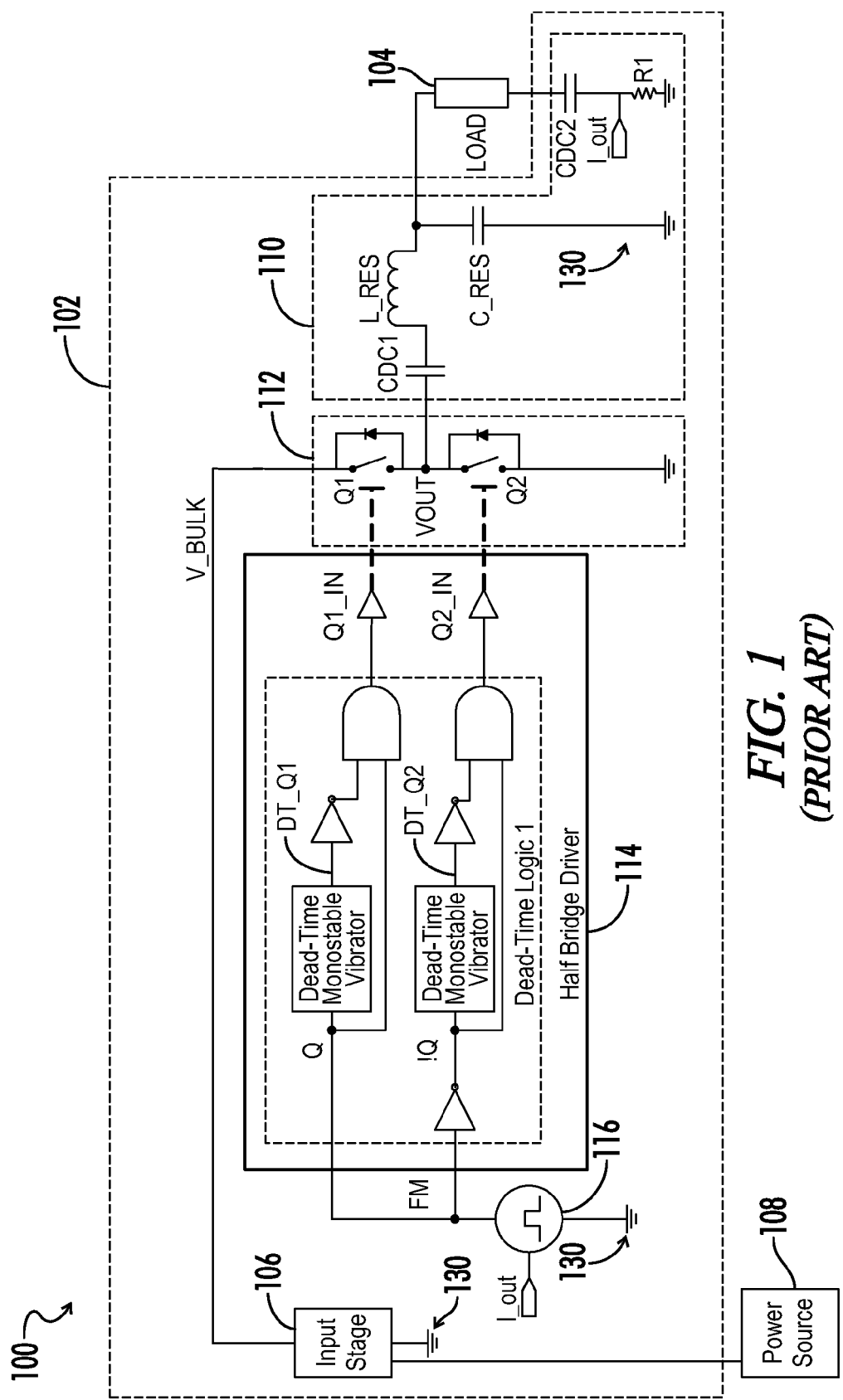
FIG. 1 is a partial schematic of a conventional fluorescent lamp ballast.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams.

Figure 2:
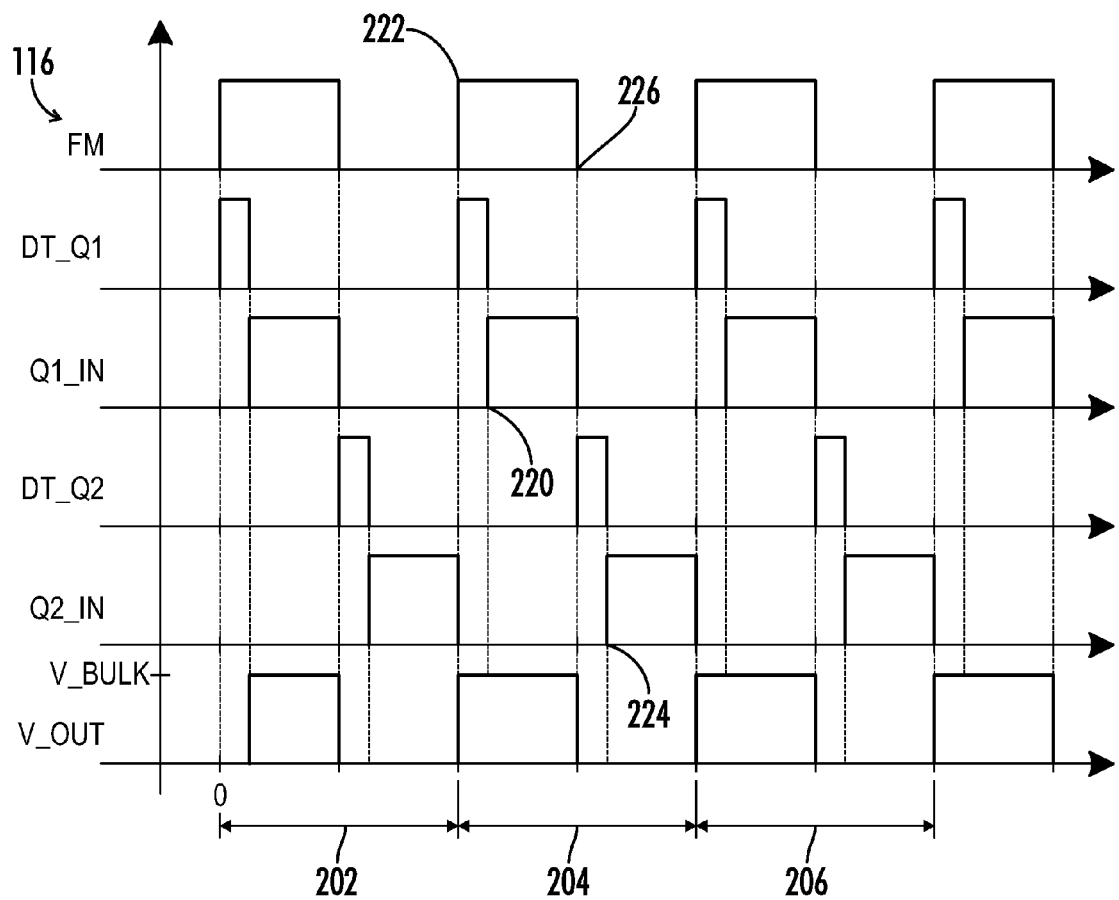
FIG. 2 is a timing diagram of the prior art fluorescent lamp ballast of FIG. 1.

Referring to FIGS. 1 and 2, a conventional electronic ballast 100 includes an input stage 106, a signal generator 116, a half-bridge driver 114, a half-bridge inverter 112, and a resonant tank circuit 110. The ballast 100 receives power from a power source 108 and provides power to a load 104 (e.g., a light source such as a fluorescent lamp). The input stage 106 receives power from the power source 108 and provides a direct current (DC) power rail V_BULK and a ground 130 to the ballast 100. In one embodiment, the power source 108 is an alternating current (AC) power source (e.g. line power), and the input stage 106 includes a rectifier and DC-to-DC converter. In one embodiment, the input stage 106 is a power factor correcting input stage. In one embodiment, the ballast 100 includes a current sensing resistor R1 connected in series with the load 104. The current sensing resistor R1 provides a signal indicative of a current through the load 104 to a signal generator 116 of the ballast 100. The signal generator 116 provides a frequency modulated control signal FM to the half-bridge driver 114. In one embodiment, the half-bridge driver 114 receives the frequency modulated signal FM from the signal generator 116 and provides an upper switch drive signal and a lower switch drive signal as a function of the frequency modulated signal FM. The half-bridge inverter 112 receives the upper switch drive signal Q1_IN and the lower switch drive signal Q2_IN and provides an output signal V_OUT to the resonant tank circuit 110 as a function of the upper switch drive signal Q1_IN and the lower switch drive signal Q2_IN. The resonant tank circuit 110 receives the output signal V_OUT from the half-bridge inverter and provides power to the load 104 as a function of the received output signal V_OUT.

In one embodiment, the half-bridge driver 114 decreases a frequency of the frequency modulated control signal FM to increase an output current of the ballast 100 and increases the frequency of the frequency modulated control signal FM to decrease an output current of the ballast 100. In one embodiment, the signal generator 116 provides the frequency modulated signal FM with a duty cycle of 5% or less (e.g., exactly 50%).

In one embodiment, the half-bridge driver 114 receives the frequency modulated signal FM from the signal generator 116 and provides an upper switch drive signal and a lower switch drive signal as a function of the frequency modulated signal FM. The half-bridge inverter 112 receives the upper switch drive signal Q1_IN and the lower switch drive signal Q2_IN and provides an output signal to the resonant tank circuit 110 as a function of the upper switch drive signal Q1_IN and the lower switch drive signal Q2_IN.

Referring to FIG. 2, a first period 202, a second period 204, and a third period 206 of the frequency modulated signal FM are shown. The first period 202 is shortened due to the absence of current in the resonant tank circuit 110. Referring to the second period 204, a turn on-time 200 of the upper switch drive signal Q1_IN is offset from a turn on-time 222 of the frequency modulated signal FM by a delay time (e.g., dead time) DT_Q1, and a turn on-time 224 of the lower switch drive signal Q2_IN is offset from a turn off time 226 of the frequency modulated signal FM by an delay time DT_Q2. These dead times protect an upper switch Q1 and a lower switch Q2 of the half-bridge inverter 112 from over-current damage during operation. However, the regularity of the symmetrical currents can induce standing waves in fluorescent lamps which cause striations to appear. Asymmetrical currents tend to reduce or eliminate standing waves and striations in fluorescent lamps.

Figure 3:
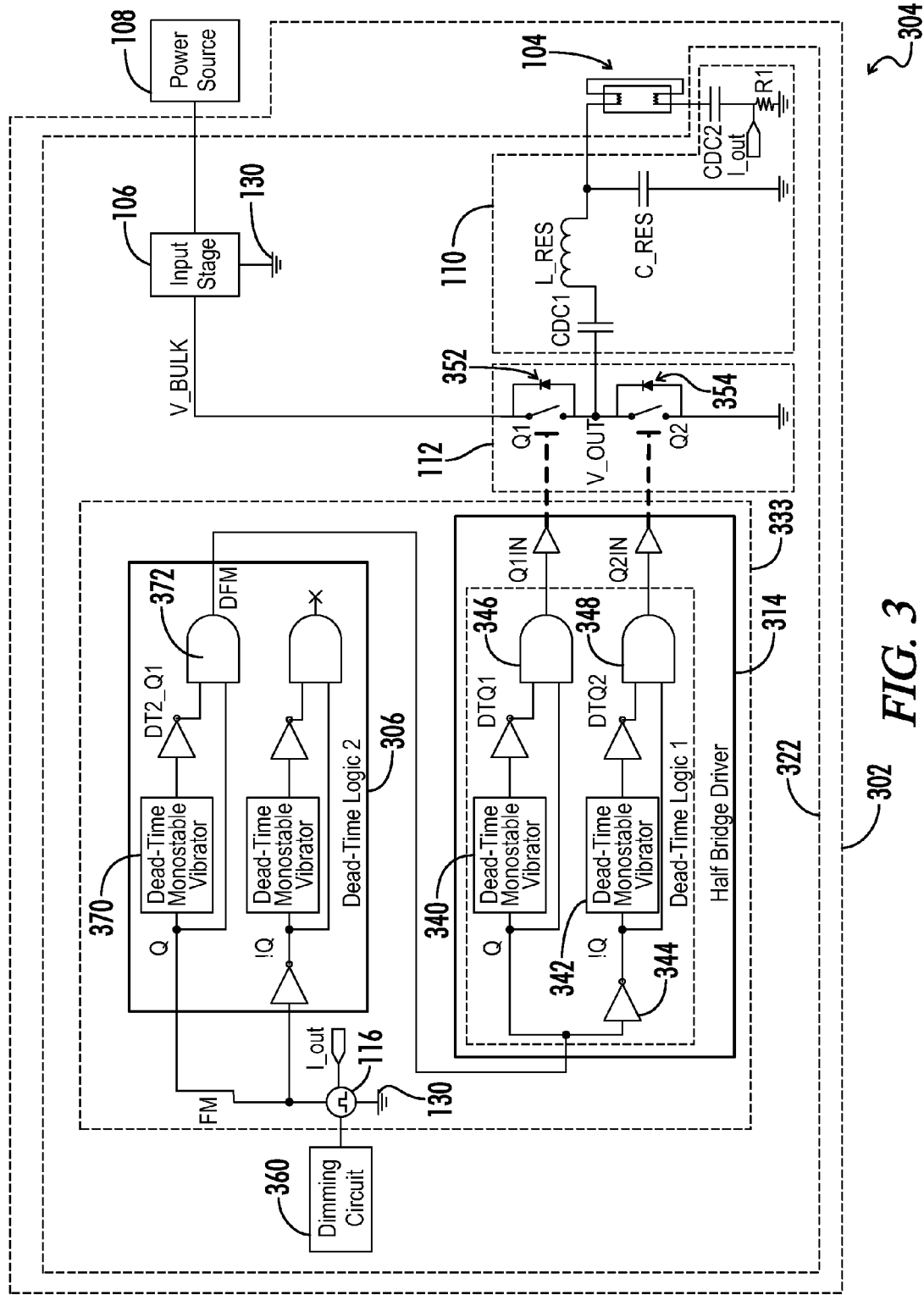
FIG. 3 is a block diagram and partial schematic of an embodiment of a light fixture including a driver circuit and fluorescent lamp in accordance with the present invention.
Figure 4:
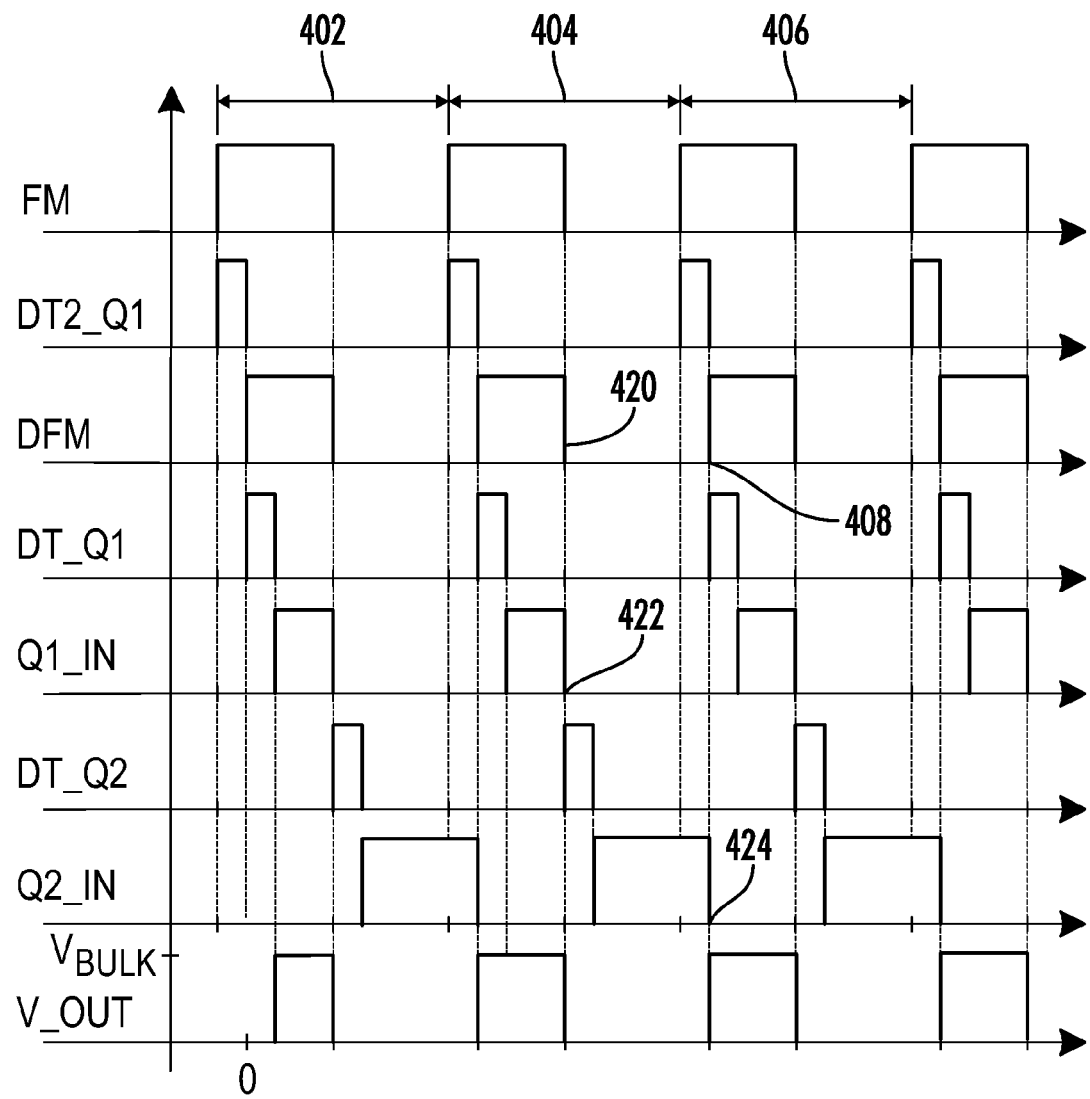
FIG. 4 is a timing diagram for the driver circuit of FIG. 3.

Referring to FIGS. 3 and 4, a light fixture 304 receives power from the power source 108 and provides power to the light source 104. In one embodiment, the light fixture 304 does not require a DC choke for proper operation. The light source 104 provides illumination in response to receiving power from the light fixture 304. The light fixture 304 includes a driver circuit 322 and a housing 302. The housing 302 supports the driver circuit 322 and the light source 104. The driver circuit 322 provides power to the light source 104 from the power source 108. In one embodiment, the light source 104 is a florescent lamp having a first filament connected in series with a second filament.

The driver circuit 322 includes an input stage 106, a controller 333, the half-bridge inverter 112, and the resonant tank circuit 110. The input stage 106, the half-bridge inverter 112, and the resonant tank circuit 110 operate as described above with respect to the conventional ballast shown in FIGS. 1 and 2. In one embodiment, the controller 333 includes the signal generator 116, a delay circuit 306, and a half-bridge driver 314. The signal generator 116 provides a frequency modulated signal having a duty cycle of 50% or less. As described above, the signal generator 116 varies the operating frequency of the frequency modulated signal as a function of the output current or output voltage provided to the light source 104. In one embodiment, the half-bridge driver 314 is configured similarly to and operates similarly to the half-bridge driver 114 shown in FIG. 1. In one embodiment, the controller 333 further includes a delay circuit 306. The delay circuit 306 may be configured similarly and operates similarly to the half-bridge driver circuits 114 and 314, however only the real (i.e., non-imaginary) portion of the output is used.

The delay circuit 306 receives the frequency modulated signal FM, and delay a turn-on time of the frequency modulated signal to generate a delayed frequency modulated signal DFM. In one embodiment, the delay circuit 306 includes a primary delay circuit 370 and a primary AND gate 372. The primary delay circuit 370 is configured to receive the frequency modulated signal FM from the signal generator 116 and clip a front end of the frequency modulated signal FM to produce a clipped frequency modulated signal DT2_Q1. The primary AND gate 372 has a first input connected to the primary delay circuit 370 to receive the clipped frequency modulated signal DT2_Q1 and a second input connected to the signal generator 116 to receive the frequency modulated signal FM. The primary AND gate 372 outputs the delayed frequency modulated signal DFM. In another embodiment, delaying the frequency modulated signal FM is accomplished via a microcontroller or ASIC.

In one embodiment, the half-bridge inverter 112 includes an upper switch Q1 and a lower switch Q2. The half-bridge inverter 112 has an output V_OUT. The upper switch Q1 receives the upper switch drive signal Q1_IN and conducts current from the DC power rail V_BULK of the driver circuit 322 to the output of the half-bridge inverter V_OUT during the on-time of the upper switch drive signal Q1_IN. Lower switch Q2 receives the lower switch drive signal Q2_IN and conducts current from the output of the half-bridge inverter V_OUT during the on-time of the lower switch drive signal Q2_IN. In one embodiment, the half-bridge inverter 112 further includes a first flyback diode 352 and a second flyback diode 354. The first flyback diode 352 has a cathode connected to the DC power rail V_BULK and an anode connected to the output of the half-bridge inverter V_OUT. The second flyback diode 354 has a cathode connected to the output of the half-bridge inverter V_OUT and an anode connected to the ground 130 of the driver circuit 322.

In one embodiment, the half-bridge driver 314 receives the delayed frequency modulated signal DFM and provides the upper switch drive signal Q1_IN and the lower switch drive signal Q2_IN as a function of the delayed frequency modulated signal DFM. In one embodiment, the half-bridge driver 314 includes a first dead time delay 340, a first AND gate 346, a NOT gate 344, a second dead time delay 342, and a second AND gate 348. The first dead time delay 340 delays a turn on-time of the upper switch drive signal Q1_IN from a turn on-time of the delayed frequency modulated signal DFM. A turn-off time of the upper switch drive signal Q1_IN corresponds to a turn-off time of the delayed frequency modulated signal DFM and the frequency modulated signal FM.

The first AND gate 346 has an output, a first input connected to the first dead time delay 340, and a second input connected to the delay circuit 306. The output of the first AND gate 346 provides the upper switch drive signal Q1_IN to the control terminal of the upper switch Q1 of the half-bridge inverter 112. The NOT gate 344 receives the delayed frequency modulated signal DFM and inverts the delayed frequency modulated signal DFM to generate an inverted delayed frequency modulated signal. The second dead time delay 342 delays a turn-on time of the lower switch drive signal Q2_IN from a turn-on time of the inverted delayed frequency modulated signal. A turn-off time of the lower switch drive signal Q2_IN corresponds to a turn-off time of the inverted delayed frequency modulated signal. The second AND gate 348 has an output, a first input connected to an output of the second dead time delay 342, and a second input connected to the output of the NOT gate 344. The output of the second AND gate 348 provides the lower switch drive signal Q2_IN to the control terminal of the lower switch Q2 of the half-bridge inverter 112.

In one embodiment, the resonant tank circuit 110 includes a resonant inductor L_RES, a resonant capacitor C_RES, and a DC blocking capacitor CDC1. The resonant inductor L_RES is connected between an output of the half-bridge inverter V_OUT and the light source 104. The resonant capacitor C_RES is connected between the light source 104 and the ground 130 of the driver circuit 322. The DC blocking capacitor CDC1 is connected in series with the resonant inductor L_RES between the output of the half-bridge inverter V_OUT and the light source 104.

In one embodiment, the driver circuit 322 further includes a dimming circuit 360. The dimming circuit 360 receives a dimming signal and provides a signal indicative of a target current to the controller 333. As discussed above, the current sensing resistor R1 is connected between the ground 130 of the driver circuit 322 and the light source 104. The controller 333 adjusts the operating frequency of the upper switch drive signal Q1_IN and the lower switch drive signal Q2_IN as a function of the current signal from the current sensing resistor R1 to maintain the current through the light source 104 at the target current provided by the dimming circuit 360.

Referring to FIG. 4, a first period 402, a second period 404, and a third period 404 of the frequency modulated signal FM are shown together with other relevant signals within the driver circuit 322 in a timing diagram. Referring to the second illustrated period 404, for example, a turn-off time 422 of the upper switch drive signal Q1_IN corresponds to a turn-off time 420 of the delayed frequency modulated signal DFM. A turn-off time 424 of the lower switch drive signal Q2_IN for the second period 404 of the frequency modulated signal FM corresponds to a turn-off time of the inverted delayed frequency modulated signal. That is, the turn-off time 424 of the lower switch drive signal Q2_IN for the second period 404 of the frequency modulated signal FM corresponds with or coincides with a turn on-time 408 of the delayed frequency modulated signal DFM during the subsequent period of the frequency modulated signal FM (i.e., the third period 406). Although all delay times and/or dead times shown in FIG. 4 are similar, it is contemplated that delay or dead times may vary among various signals in some embodiments. Further, although the delays are shown implemented with monostable vibrators, a microprocessor may also be used to generate drive signals with these delays and/or timings. Certain buffers and inverters shown in the drawings have been omitted from the discussion herein. It is contemplated that the logic and timing signals described herein may be inverted and/or buffered within the scope of the claims.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful METHOD TO CONTROL STRIATIONS IN A LAMP POWERED BY AN ELECTRONIC BALLAST it is not intended that such references be construed as limitations upon the scope of this invention except as set forth in the following claims.

What is claimed is:

1. A driver circuit configured to provide power to a load from a power source, the driver circuit comprising:
   a controller configured to provide an upper switch drive signal and a lower switch drive signal, wherein an on-time of the upper switch drive signal is less than an on-time of the lower switch drive signal;
   a half-bridge inverter coupled to the controller and configured to provide an output signal as a function of the upper drive switch signal and the lower drive switch signal; and
   a resonant tank circuit coupled to the half-bridge inverter and configured to receive the output signal from the half-bridge inverter and provide power to the load as a function of the received output signal; and
   wherein the controller comprises
      a signal generator configured to provide a frequency modulated signal having a duty cycle of 50% or less, wherein the frequency is modulated as a function of an output current or output voltage provided to the load,
      a delay circuit coupled to the signal generator and configured to receive the frequency modulated signal, and delay a turn on-time of the frequency modulated signal to generate a delayed frequency modulated signal, and
      a half-bridge driver coupled to the delay circuit and configured to receive the delayed frequency modulated signal and provide the upper switch drive signal and the lower switch drive signal as a function of the delayed frequency modulated signal,
      the half-bridge driver further comprising:
         a first dead time delay configured to delay a turn on-time of the upper switch drive signal from a turn on-time of the delayed frequency modulated signal,
         a NOT gate configured to receive the delayed frequency modulated signal and invert the delayed frequency modulated signal to generate an inverted delayed frequency modulated signal, and
         a second dead time delay configured to delay a turn on-time of the lower switch drive signal from a turn on-time of the inverted delayed frequency modulated signal.

2. The driver circuit of claim 1, wherein the controller comprises:
a signal generator configured to provide a frequency modulated signal having a duty cycle of 50% or less, wherein the frequency is modulated as a function of an output current or output voltage provided to the load;
a delay circuit configured to receive the frequency modulated signal, and delay a turn on-time of the frequency modulated signal to generate a delayed frequency modulated signal; and
a half-bridge driver configured to receive the delayed frequency modulated signal and provide the upper switch drive signal and the lower switch drive signal as a function of the delayed frequency modulated signal, the half-bridge driver comprising
a first dead time delay configured to delay a turn on-time of the upper switch drive signal from a turn on-time of the delayed frequency modulated signal, wherein a turn off time of the upper switch drive signal corresponds to a turn off time of the delayed frequency modulated signal and the frequency modulated signal,
a NOT gate configured to receive the delayed frequency modulated signal and invert the delayed frequency modulated signal to generate an inverted delayed frequency modulated signal, and
a second dead time delay configured to delay a turn on-time of the lower switch drive signal from a turn on-time of the inverted delayed frequency modulated signal, wherein a turn off time of the lower switch drive signal corresponds to a turn off time of the inverted delayed frequency modulated signal.

3. The driver circuit of claim 1 further comprising:
the half-bridge inverter comprises an upper switch having a control terminal and a lower switch having a control terminal;
the controller comprises
a signal generator configured to provide a frequency modulated signal having a duty cycle of 50% or less, wherein the frequency is modulated as a function of an output current or output voltage provided to the load, and
a delay circuit configured to receive the frequency modulated signal, and delay a turn on-time of the frequency modulated signal to generate a delayed frequency modulated signal, the delay circuit comprising
a primary delay circuit configured to receive the frequency modulated signal and delay a turn on-time of the frequency modulated signal, and
a primary AND gate having an output, a first input connected to the primary delay circuit, and a second input connected to the signal generator, wherein the output of the primary AND gate provides the delayed frequency modulated signal; and
a half-bridge driver configured to receive the delayed frequency modulated signal and provide the upper switch drive signal and the lower switch drive signal as a function of the delayed frequency modulated signal, the half-bridge driver comprising
a first dead time delay configured to delay a turn on-time of the upper switch drive signal from a turn on-time of the delayed frequency modulated signal, wherein a turn off time of the upper switch drive signal corresponds to a turn off time of the delayed frequency modulated signal and the frequency modulated signal,
a first AND gate having an output, a first input connected to the first dead time delay, and a second input connected to the delay circuit, wherein the output of the first AND gate provides the upper switch drive signal to the control terminal of the upper switch of the half-bridge inverter,
a NOT gate configured to receive the delayed frequency modulated signal and invert the delayed frequency modulated signal to generate an inverted delayed frequency modulated signal,
a second dead time delay configured to delay a turn on-time of the lower switch drive signal from a turn on-time of the inverted delayed frequency modulated signal, wherein a turn off time of the lower switch drive signal corresponds to a turn off time of the inverted delayed frequency modulated signal, and
a second AND gate having an output, a first input connected to an output of the second dead time delay, and a second input connected to an output of the NOT gate, wherein the output of the second AND gate provides the lower switch drive signal to the control terminal of the lower switch of the half-bridge inverter.

4. The driver circuit of claim 1, wherein the half-bridge inverter has an output, and the half-bridge converter comprises:
an upper switch configured to receive the upper switch drive signal and conduct current from a direct current (DC) power rail of the driver circuit to the output of the half-bridge inverter during the on-time of the upper switch drive signal; and
a lower switch configured to receive the lower switch drive signal and conduct current form the output of the half-bridge inverter during the on-time of the lower switch drive signal.

5. The driver circuit of claim 1, wherein the half-bridge inverter has an output, and the half-bridge converter comprises:
an upper switch configured to receive the upper switch drive signal and conduct current from a direct current (DC) power rail of the driver circuit to the output of the half-bridge inverter during the on-time of the upper switch drive signal;
a lower switch configured to receive the lower switch drive signal and conduct current from the output of the half-bridge inverter during the on-time of the lower switch drive signal;
a first flyback diode having a cathode connected to the DC power rail and an anode connected to the output of the half-bridge inverter; and
a second flyback diode having a cathode connected to the output of the half-bridge inverter and an anode connected to a ground of the driver circuit.

6. The driver circuit of claim 1, wherein the resonant tank circuit comprises:
a resonant inductor connected between an output of the half-bridge inverter and the load;
a resonant capacitor connected between the load and a ground of the driver circuit; and
a direct current (DC) blocking capacitor connected in series with the resonant inductor between the output of the half-bridge inverter and the load.

7. The driver circuit of claim 1, further comprising:
a current sensing resistor connected between a ground of the driver circuit and the load, the current sensing resistor configured to provide a current signal indicative of a current through the load, wherein the controller is further configured to adjust an operating frequency of the upper switch drive signal and the lower switch drive signal as a function of the current signal to maintain the current through the load at a target current.

8. The driver circuit of claim 1, further comprising:
a dimming circuit configured to receive a dimming signal and provide a signal indicative of a target current to the controller;
a current sensing resistor connected between a ground of the driver circuit and the load, the current sensing resistor configured to provide a current signal indicative of a current through the load; and
wherein the controller is further configured to adjust an operating frequency of the upper switch drive signal and the lower switch drive signal as a function of the current signal to maintain the current through the load at the target current.

9. The driver circuit of claim 1, wherein the load comprises a fluorescent lamp having a first filament connected in series with a second filament, and the driver circuit provides power to the load without a DC choke.

10. A light fixture configured to receive power from a power source and provide power to a light source, wherein the light source is configured to provide light in response to receiving power from the light fixture, the light fixture comprising:
a driver circuit configured to provide power to the light source from a power source, the driver circuit comprising
an input stage configured to receive power from the power source and provide a direct current (DC) power rail and a ground to the driver circuit,
a controller configured to provide an upper switch drive signal and a lower switch drive signal, wherein an on-time of the upper switch drive signal is less than an on-time of the lower switch drive signal,
a half-bridge inverter configured to provide an output signal as a function of the upper drive signal and the lower drive signal, and
a resonant tank circuit configured to receive the output signal from the half-bridge inverter and provide power to the light source as a function of the received output signal; and
a housing configured to support the driver circuit and the light source; and
wherein the controller comprises
a signal generator configured to provide a frequency modulated signal having a duty cycle of 50% or less, wherein the frequency is modulated as a function of an output current or output voltage provided to the light source,
a delay circuit configured to receive the frequency modulated signal, and delay a turn on-time of the frequency modulated signal to generate a delayed frequency modulated signal, and
a half-bridge driver configured to receive the delayed frequency modulated signal and provide the upper switch drive signal and the lower switch drive signal as a function of the delayed frequency modulated signal, the half-bridge driver comprising
a first dead time delay configured to delay a turn on-time of the upper switch drive signal from a turn on-time of the delayed frequency modulated signal,
a NOT gate configured to receive the delayed frequency modulated signal and invert the delayed frequency modulated signal to generate an inverted delayed frequency modulated signal, and
a second dead time delay configured to delay a turn on-time of the lower switch drive signal from a turn on-time of the inverted delayed frequency modulated signal.

11. The light fixture of claim 10, wherein the controller comprises:
a signal generator configured to provide a frequency modulated signal having a duty cycle of 50% or less, wherein the frequency is modulated as a function of an output current or output voltage provided to the light source;
a delay circuit configured to receive the frequency modulated signal, and delay a turn on-time of the frequency modulated signal to generate a delayed frequency modulated signal; and
a half-bridge driver configured to receive the delayed frequency modulated signal and provide the upper switch drive signal and the lower switch drive signal as a function of the delayed frequency modulated signal, the half-bridge driver comprising
a first dead time delay configured to delay a turn on-time of the upper switch drive signal from a turn on-time of the delayed frequency modulated signal, wherein a turn off time of the upper switch drive signal corresponds to a turn off time of the delayed frequency modulated signal and the frequency modulated signal,
a NOT gate configured to receive the delayed frequency modulated signal and invert the delayed frequency modulated signal to generate an inverted delayed frequency modulated signal, and
a second dead time delay configured to delay a turn on-time of the lower switch drive signal from a turn on-time of the inverted delayed frequency modulated signal, wherein a turn off time of the lower switch drive signal corresponds to a turn off time of the inverted delayed frequency modulated signal.

12. The light fixture of claim 10, wherein the half-bridge inverter comprises an upper switch having a control terminal and a lower switch having a control terminal, wherein the controller comprises:
a signal generator configured to provide a frequency modulated signal having a duty cycle of 50% or less, wherein the frequency is modulated as a function of an output current or output voltage provided to the light source;
a delay circuit configured to receive the frequency modulated signal, and delay a turn on-time of the frequency modulated signal to generate a delayed frequency modulated signal, the delay circuit comprising
a primary delay circuit configured to receive the frequency modulated signal and delay a turn on-time of the frequency modulated signal, and
a primary AND gate having an output, a first input connected to the primary delay circuit, and a second input connected to the signal generator, wherein the output of the primary AND gate provides the delayed frequency modulated signal, and
a half-bridge driver configured to receive the delayed frequency modulated signal and provide the upper switch drive signal and the lower switch drive signal as a function of the delayed frequency modulated signal, the half-bridge driver comprising
a first dead time delay configured to delay a turn on-time of the upper switch drive signal from a turn on-time of the delayed frequency modulated signal, wherein a turn off time of the upper switch drive signal corresponds to a turn off time of the delayed frequency modulated signal and the frequency modulated signal, a first AND gate having an output, a first input connected to the first dead time delay, and a second input connected to the delay circuit, wherein the output of the first AND gate provides the upper switch drive signal to the control terminal of the upper switch of the half-bridge inverter, a NOT gate configured to receive the delayed frequency modulated signal and invert the delayed frequency modulated signal to generate an inverted delayed frequency modulated signal, a second dead time delay configured to delay a turn on-time of the lower switch drive signal from a turn on-time of the inverted delayed frequency modulated signal, wherein a turn off time of the lower switch drive signal corresponds to a turn off time of the inverted delayed frequency modulated signal, and a second AND gate having an output, a first input connected to an output of the second dead time delay, and a second input connected to an output of the NOT gate, wherein the output of the second AND gate provides the lower switch drive signal to the control terminal of the lower switch of the half-bridge inverter.

13. The light fixture of claim 10, wherein the half-bridge inverter has an output, and the half-bridge converter comprises:
an upper switch configured to receive the upper switch drive signal and conduct current from the DC power rail of the driver circuit to the output of the half-bridge inverter during the on-time of the upper switch drive signal; and
a lower switch configured to receive the lower switch drive signal and conduct current form the output of the half-bridge inverter during the on-time of the lower switch drive signal.

14. The light fixture of claim 10, wherein the half-bridge inverter has an output, and the half-bridge converter comprises:
an upper switch configured to receive the upper switch drive signal and conduct current from the DC power rail of the driver circuit to the output of the half-bridge inverter during the on-time of the upper switch drive signal;
a lower switch configured to receive the lower switch drive signal and conduct current from the output of the half-bridge inverter during the on-time of the lower switch drive signal;
a first flyback diode having a cathode connected to the DC power rail and an anode connected to the output of the half-bridge inverter; and
a second flyback diode having a cathode connected to the output of the half-bridge inverter and an anode connected to the ground of the driver circuit.

15. The light fixture of claim 10, wherein the resonant tank circuit comprises:
a resonant inductor connected between an output of the half-bridge inverter and the light source;
a resonant capacitor connected between the light source and the ground of the driver circuit; and
a direct current (DC) blocking capacitor connected in series with the resonant inductor between the output of the half-bridge inverter and the light source.

16. The light fixture of claim 10, wherein the driver circuit comprises a current sensing resistor connected between the ground of the driver circuit and the light source, the current sensing resistor configured to provide a current signal indicative of a current through the light source; and
wherein the controller is further configured to adjust an operating frequency of the upper switch drive signal and the lower switch drive signal as a function of the current signal to maintain the current through the light source at a target current.

17. The light fixture of claim 10, wherein the driver circuit further comprises:
a dimming circuit configured to receive a dimming signal and provide a signal indicative of a target current to the controller;
a current sensing resistor connected between the ground of the driver circuit and the light source, the current sensing resistor configured to provide a current signal indicative of a current through the light source; and
wherein the controller is further configured to adjust an operating frequency of the upper switch drive signal and the lower switch drive signal as a function of the current signal to maintain the current through the light source at the target current.

18. The light fixture of claim 10, wherein the light source is a fluorescent lamp having a first filament connected in series with a second filament, and the light fixture excludes a DC choke.

* * * * *